United States Patent [19]

Robert

[11] Patent Number: 5,613,245
[45] Date of Patent: Mar. 18, 1997

[54] METHOD AND APPARATUS FOR INJECTING WASTES INTO A MOLTEN BATH WITH AN EJECTOR

[75] Inventor: Edgar J. Robert, Glenshaw, Pa.

[73] Assignee: Molten Metal Technology, Inc., Waltham, Mass.

[21] Appl. No.: 479,507

[22] Filed: Jun. 7, 1995

[51] Int. Cl.$^6$ .................................................. A62D 3/00
[52] U.S. Cl. ........................ 588/201; 110/346; 210/741; 210/774; 417/187; 417/190; 422/110; 422/112; 422/184.1; 422/232
[58] Field of Search ............................ 210/97, 143, 175, 210/741, 774, 790, 909, 90; 110/237, 235, 346, 238; 266/44, 82, 83; 588/201, 205, 1, 202; 422/62, 110, 111, 112, 184.1, 232

[56] References Cited

U.S. PATENT DOCUMENTS

| | | | |
|---|---|---|---|
| 2,619,496 | 11/1952 | Stanton | 422/232 |
| 4,602,574 | 7/1986 | Bach et al. | 110/237 |
| 4,950,309 | 8/1990 | Schulz. | |
| 5,191,154 | 3/1993 | Nagel | 588/201 |
| 5,322,547 | 6/1994 | Nagel et al. | 588/201 |
| 5,436,210 | 7/1995 | Wilkinson et al. | 588/201 |
| 5,489,734 | 2/1996 | Nagel et al. | 588/201 |
| 5,491,279 | 2/1996 | Robert et al. | 588/201 |

*Primary Examiner*—Joseph W. Drodge
*Attorney, Agent, or Firm*—Hamilton, Brook, Smith & Reynolds, P.C.

[57] ABSTRACT

The present invention relates to a method and an apparatus for injecting a particulate solid into a molten bath. The method includes forming a liquid stream and directing a first portion of the stream through an ejector for subsequent injection into a molten bath. A second portion of the liquid stream is directed into a receiving vessel. A particulate solid is directed into the receiving vessel, wherein the second portion of the liquid stream and the particulate solid combine to form a slurry. The slurry is directed from the receiving vessel to the ejector, whereby the slurry and the first portion of the liquid stream are combined to form a dilute slurry that is injected into the molten bath. The relative flow rates of the first and second liquid streams can be adjusted in direct relation to any change in the ratio of pressure of the two streams, controlling in this way the volume fraction of solids in the diluted slurry.

10 Claims, 1 Drawing Sheet

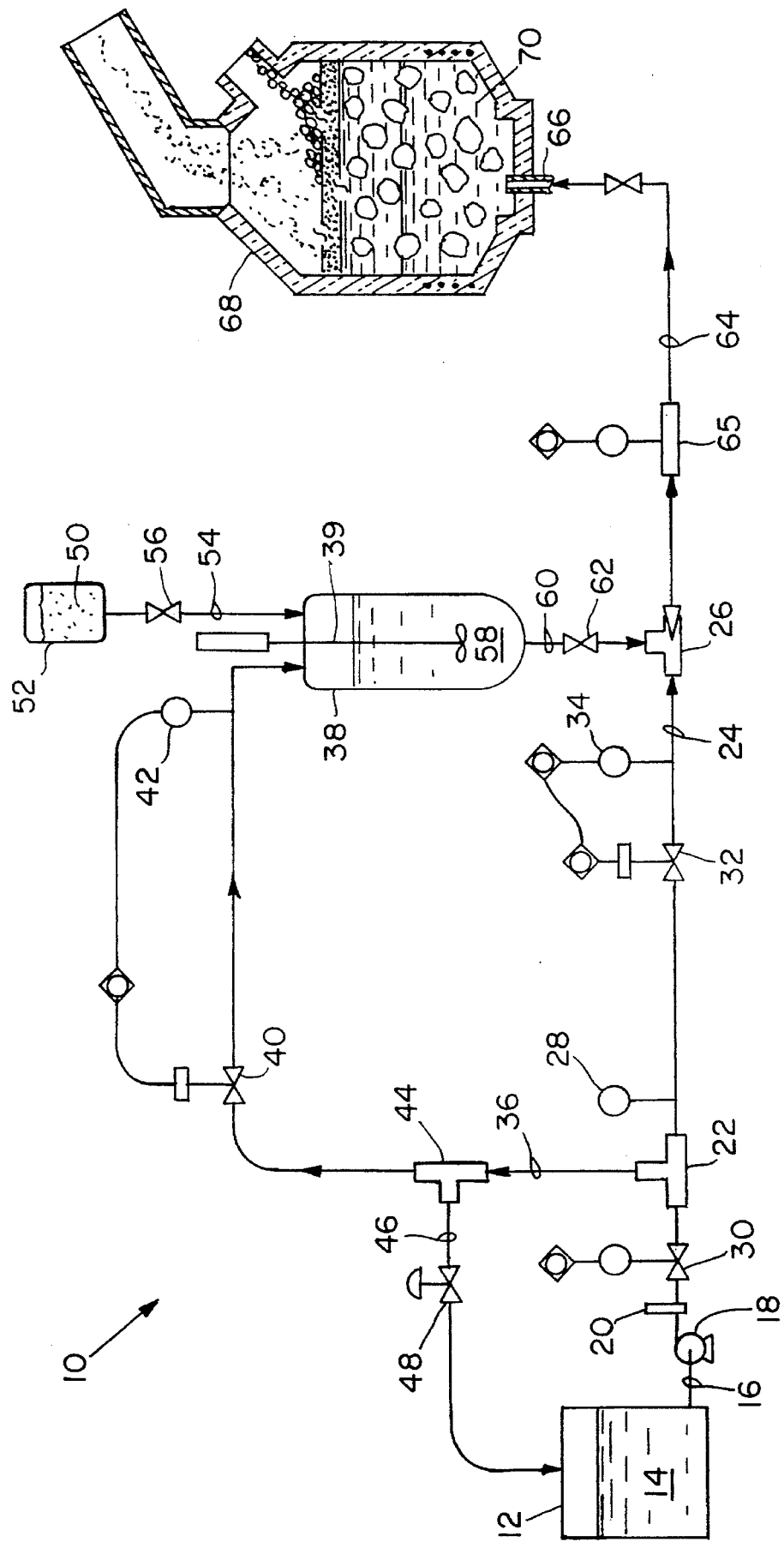

METHOD AND APPARATUS FOR INJECTING WASTES INTO A MOLTEN BATH WITH AN EJECTOR

BACKGROUND OF THE INVENTION

Available methods for treatment of hazardous wastes are limited. Conventional methods for disposal of hazardous wastes, such as incineration, can also contaminate the environment. For example, incomplete combustion of hazardous wastes typically causes release of pollutants to the atmosphere in the form of gases and dust. Many types of hazardous wastes are generated every year. The wastes include organic materials, such as pesticides, polychlorinated biphenyls (PCBs), polybrominated biphenyls (PBBs), paints and solvents. Also, other wastes include inorganic material, such as the oxides of iron, zinc, aluminum, copper and magnesium and the salts of ferric chloride, ferrous chloride, aluminum chloride, etc.

Disposal of hazardous wastes in landfills and by incineration has become an increasingly difficult problem because of diminishing availability of disposal space, strengthened governmental regulations, and the growing public awareness of the impact of hazardous substance contamination of the environment. Release of hazardous organic wastes to the environment can contaminate air and water supplies, thereby diminishing the quality of life in the affected populations.

One alternative treatment of hazardous wastes includes introduction of the wastes into a molten bath, such as a molten metal bath. Typically, the wastes are directed onto the top of a molten bath contained within a suitable reactor. However, wastes often do not mix well with the bath and are consequently discharged from the reactor before decomposition is complete.

In another method, solid wastes are suspended in an inert gas and injected into a molten bath. However, containment and transfer of solids suspended in an inert gas can be difficult. For example, in Q-BOP facilities, powder injection equipment is confined to an enclosed area in an effort to contain spillage. Plugging, valve and instrument damage, transfer of solids to an injection unit and accidental release of solids can make the operation problematic.

Therefore, a need exists for a method and apparatus for injection of solids into molten baths which overcome or minimize the above-mentioned problems.

SUMMARY OF THE INVENTION

The present invention relates to a method and an apparatus for injecting a particulate solid into a molten bath.

The method includes forming a liquid stream. A first portion of the liquid stream is directed through an ejector for subsequent injection into a molten bath. A second portion of the liquid stream is directed into a receiving vessel. A particulate solid is directed into the receiving vessel, whereby the second portion of the liquid stream and the particulate solid combine to form a slurry. The slurry is directed from the receiving vessel to the ejector. The slurry and the first portion of the liquid stream are combined in the ejector to form a dilute slurry that is injected into the molten bath.

The apparatus includes an ejector which is in fluid communication with a molten bath. The ejector is in fluid communication with a liquid source for directing a first portion of a liquid stream from the liquid source through the ejector. The ejector is in fluid communication with a slurry reservoir, whereby a slurry can be directed through the ejector into the molten bath by conduction of the first portion of the liquid stream from the liquid source through the ejector. Suitable means direct a second portion of the liquid stream into the slurry reservoir, whereby said second portion of the liquid stream can be combined with the slurry in the slurry reservoir.

A main advantage of the invention is elimination of moving parts (pumps, valves, etc.) in contact with the liquid-containing particulate. This feature reduces maintenance dramatically, and increases the overall reliability of the process. Also, the accumulation of particulates in an apparatus employed to inject slurries into molten baths is substantially reduced. Consequently, obstruction of equipment by particulate containing feeds can be prevented. By minimizing accumulation of particulates and blockage of injection-related apparatus, shutdowns of apparatus for routine maintenance and the likelihood of accidental release of materials, such as molten baths and hazardous feeds, can be significantly reduced.

BRIEF DESCRIPTION OF THE DRAWING

The Figure is a schematic representation of one embodiment of the apparatus of the invention.

DETAILED DESCRIPTION OF THE INVENTION

The features and other details of the method of the invention will now be more particularly described with reference to the accompanying Figure and pointed out in the claims. It will be understood that particular embodiments of the invention are shown by way of illustration and not as limitations of the invention. The principle features of this invention can be employed in various embodiments without departing from the scope of the invention.

The present invention generally relates to a method and system for injecting a liquid slurry into a molten bath. U.S. Ser. No. 08/013,756, filed Feb. 4, 1993 now U.S. Pat. No. 5,436,240, by Wilkinson et al., disclose a method for injecting a liquid into a molten metal bath. U.S. Ser. No. 08/042,609, filed Apr. 2, 1993 now U.S. Pat. No. 5,491,279, by Robert et al., disclose a method for top-charging a solid waste into a molten bath wherein the solid waste is oxidized to form a gaseous oxygenated product. The teachings of U.S. Ser. Nos. 08/013,756 and 08/042,609 are incorporated herein by reference in their entirety.

In one embodiment of the present invention, illustrated in the Figure, apparatus 10 includes liquid source 12. Liquid waste or a suitable carrier liquid 14 is contained within liquid source 12. Examples of suitable carrier liquids include: organic liquids, such as oil; inorganic liquids, such as water; polar and nonpolar liquids; etc. In one embodiment, oil is used both as a carrier liquid and as a fuel for subsequent chemical reaction or decomposition.

Line 16 extends from liquid source 12 through pump 18, filter 20 to T-Joint 22. Line 24 extends from T-joint 22 to ejector 26. Pressure indicator 28, pressure control valve 32 and pressure transmitter 34 are located at line 24. Carrier liquid 14 is directed from liquid source 12 through line 16 by pump 18 to form a liquid stream. A first portion of the liquid stream is directed from T-joint 2 through line 24 to ejector 26.

Line 36 extends from T-joint 22 to receiving vessel 38. Pressure control valve 40 and pressure transmitter 42 are located at line 36. A second portion of the liquid stream is directed from T-joint 22 through line 36 and into receiving vessel 38. Receiving vessel 38 includes agitator 39.

T-joint 44 is located at line 36. Line 46 extends from T-joint 44 to tank 12. Pressure control valve 48 is located at line 46. A portion of the liquid stream can be directed from T-joint 44 through line 46 back to liquid source 12.

Particulate solids 50 are contained in powder hopper 52. Line 54 extends from powder hopper 52 to receiving vessel 38. Valve 56, or a suitable lock-hopper mechanism, is located at line 54. Particulate solids are directed from powder hopper 52 through line 54 to receiving vessel 38. The second portion of the liquid stream and particulate solids are combined in receiving vessel 38 to form slurry 58. Gas space above slurry 58 is typically at positive gauge pressure.

Formation of slurry 58 can be assisted by activation of agitator 39 at vessel 38. Typically, the concentration of particulates in slurry 58 is in a range of between about ten percent and about sixty percent. Line 60 extends from receiving vessel 38 to ejector 26. Shut-off valve 62 is located at line 60. Line 64 extends from ejector 26 to tuyere 66 at reactor 68. Flow transmitter 65 is located at line 64. Tuyere 66 can be a concentric or multiple-concentric tuyere. Molten bath 70 is contained in reactor 68. Examples of suitable molten baths include molten metal baths and molten salt baths.

Slurry is directed to the ejector 26 via differential pressure between the receiving vessel 38 indicated by pressure transmitter 42, and the pressure in ejector 26, as measured by pressure transmitter 34. The flow rate of the slurry from receiving tank 38 to ejector 26 is controlled by the amount of differential pressure described above. The first portion of the liquid stream and slurry 58 are combined at ejector 26 to form a dilute slurry. Typically, the concentration of particulates in the dilute slurry is in a range of between about five percent and fifty percent. The dilute slurry is directed through line 64 and then injected through tuyere 66 into molten bath 70.

Apparatus 10 is generally constructed of, for example, carbon steel, stainless steel, glass-lined steel, etc.

The flow rate of the first liquid stream is controlled by pressure transmitter 34 and pressure control valve 32. The flow is measured by flow element 30, and it is a function of the set point of pressure control valve 32. Pressure transmitter 34 senses pressure $P_1$ of the liquid stream in line 24 prior to entry into ejector 26. Pressure control valve 40 and pressure transmitter 42 control pressure $P_2$ of the liquid stream at line 36 proximate to vessel 38.

The volume fraction of solids in line 64 will depend on the ratio of flow rate from the receiving tank 38 to the ejector 26 and the flow rate of clean carrier liquid from reservoir 12 to the ejector 26. This ratio of flow rate is controlled by the ratio of pressure $P_2:P_1$. A lower pressure ratio will lead to a more diluted slurry in the line 64, and vice versa. The actual limits of volume fraction of solids in the liquid will depend on the specific characteristics of the solid and the liquid.

Optionally, accumulation of particulates of the dilute slurry in ejector 26, line 64 and tuyere 66 can be monitored by measuring the relative pressure of the first and second portions of the liquid stream at pressure transmitters 34 and 42. For example, when the ratio of $P_2:P_1$ decreases beyond a set point, pressure control valve 32 is activated to increase the rate of flow of the first portion of the liquid stream relative rate of flow of the second portion. As a result, the dilute slurry will become more dilute and accumulated particulates will be flushed from ejector 26, line 64 and tuyere 66. Removal of accumulated particulates causes the ratio of $P_2:P_1$ to increase to a set point. As the ratio of $P_2:P_1$ increases, the rate of flow of the first portion of the liquid stream is reduced by pressure control valve 32. The resultant dilute slurry in ejector 26 will consequently have an increased ratio of particulate solids to liquid. Mixing of slurry 58 in ejector 26 can be interrupted at anytime by shut-off valve 62.

Pressure control valves 40 and 48 operate to prevent surging and to maintain a positive direction of flow.

Equivalents

Those skilled in the art will recognize, or be able to ascertain using no more than routine experimentation, many equivalents of the invention described specifically herein. Such equivalents are intended to be encompassed in the scope of the following claims.

I claim:

1. A method for injecting a particulate solid into a molten bath, comprising the steps of:
   a) forming a liquid stream;
   b) directing a first portion of said liquid stream through an ejector for subsequent injection into a molten bath;
   c) directing an adjustable second portion of the liquid stream into a receiving vessel;
   d) directing a particulate solid into said receiving vessel, whereby the second portion of the liquid stream and the particulate solid combine to form a slurry; and
   e) directing said slurry from the receiving vessel to the ejector, whereby the slurry and the first portion of the liquid stream are combined to form a dilute slurry that is injected into the molten bath.

2. The method of claim 1, further including the step of adjusting the ratio of flow rate of the second portion of said liquid stream to the flow rate of the first portion in direct relation to a change in the ratio of pressure of the second liquid stream portion to pressure of the first liquid stream portion.

3. The method of claim 2, further including the step of directing a third portion of said liquid stream to a liquid source for said liquid stream.

4. An apparatus for injecting a particulate solid into a molten bath, comprising:
   a) an ejector which is in fluid communication with a molten bath;
   b) a liquid source in fluid communication with said ejector;
   c) means for directing a first portion of a liquid stream from the liquid source through said ejector;
   d) a slurry reservoir in fluid communication with said ejector, whereby a slurry in said slurry reservoir can be directed through the ejector and into the molten bath by conduction of said first portion of the liquid stream through said ejector; and
   e) means for directing an adjustable second portion of the liquid stream into the slurry reservoir, whereby said second portion of the liquid stream is combined with the slurry in the slurry reservoir.

5. The apparatus of claim 4, further including means for directing particulates into said slurry reservoir.

6. The apparatus of claim 5, further including means for monitoring the ratio of pressure of the first and second portions of the liquid stream.

7. The apparatus of claim 6, further including means for controlling the rate at which the liquid is directed from said first portion of the liquid stream through said ejector.

8. The apparatus of claim 7, further including means for causing change in the ratio of pressure of the first and second portions of the liquid stream to change the rate at which the liquid from said first portion of the liquid stream is directed through the ejector.

9. The apparatus of claim 6, further including means for controlling the rate at which the liquid is directed from said second portion of the liquid stream into said slurry reservoir.

10. The apparatus of claim 9, further including means for causing change in the ratio of pressure of the first and second portions of the liquid stream to change the rate at which the second portion of the liquid stream is directed into the slurry reservoir.

* * * * *